United States Patent Office 3,658,738
Patented Apr. 25, 1972

3,658,738
WATER-THINNABLE PAINT BINDERS AND THE
PREPARATION THEREOF
William J. van Westrenen, Delft, Netherlands, assignor to
Shell Oil Company, New York, N.Y.
No Drawing. Filed June 18, 1969, Ser. No. 834,532
Claims priority, application Great Britain, Jan. 6, 1969,
795/69
Int. Cl. C08g 17/01, 17/12, 17/16
U.S. Cl. 260—22 EP                            4 Claims

ABSTRACT OF THE DISCLOSURE

The disclosure describes novel condensation products which form films having superior hardness and good salt spray resistance suitable as electrodeposition paint binders which are the partially neutralized reaction product of a polyepoxide and rosin acids, said reaction product having been further esterified with an ethylenically unsaturated fatty acid and subsequently reacted with at least 4% by weight of an ethylenically unsaturated polycarboxylic acid or anhydride thereof. The disclosure also describes the process for producing the above-described novel composition.

Water-thinnable paint binders are usually prepared by preparing a resin containing free carboxyl groups and by neutralizing the resin completely or partially with an alkaline material, such as a nitrogen base.

For instance, the British Pat. No. 962,974 discloses a process, wherein a polyepoxide is completely esterified with linseed oil fatty acids and the resulting product is reacted with maleic anhydride at 240° C. to introduce free carboxyl groups; this maleinized resin is then solubilized in water by neutralization with ammonia and addition of ethylene glycol monobutyl ether, and used as a paint binder.

The use of water-thinnable paint binders and paints is at present well-established. One of the advantages is that they offer the possibility for electrodeposition from solution onto metals to form a pore-free coating in thin layers, even at places difficult to reach with spray gun or brush.

On the other hand, the electrodeposition technique provides many new problems in the paint-binder technology. For example, paint driers, such as salts of cobalt and manganese, well-known for accelerating the cross-linking of ethylenically unsaturated fatty acid residues of oils and resins in conventional paints and water-soluble paints applied by dipping, spraying or brushing, apparently do not have this function in electrodeposited films, and therefore hardness and other mechanical and chemical properties in conventional paint applications promoted by driers have to be inserted by other means, such as incorporation of specific groups in the binder molecule. In the binders described in the British Pat. No. 962,974 one such a modification involved the replacement of part of the linseed oil fatty acid by benzoic acid, to provide electro-deposited films of improved hardness, and having a very good corrosion resistance, in particular salt spray resistance, when formulated with chromate pigments. Chromate pigments, however, while improving the corrosion resistance of paint films, have in electro-deposition formulations the drawback that they diminish the stability of the paint bath under conditions of continuous circulation and low paint consumption which in actual practice are often encountered. Another drawback of chromate pigments is the toxicity level which makes them not so acceptable for some applications.

In another modification of the binders of British Pat. No. 962,974 it was tried to replace the linseed oil fatty acids by equivalent amounts of tall oil fatty acids, or mixtures of linseed oil fatty acids and rosin acids. However, the paint films from such modifications were extremely soft, and furthermore the binder solutions, on storage for a few days at ambient temperature, separated out crystalline material; another drawback was the high viscosity of the resins so produced. It was found that by a modification of the manufacturing technique rosin acids could be used for the preparation of binders which had a very good storage stability in aqueous solution, provided films of superior hardness, and most peculiarly, provided without the use of chromate pigments, films of very good salt spray resistance.

The present invention is thus directed towards the process for producing novel condensation products which are thinnable with water after neutralization and which contain free carboxyl groups comprising (1) reacting a polyepoxide with rosin acids in a ratio of from about 0.5 to 1.0 acid equivalent of rosin acids per epoxy equivalent; (2) esterifying the resulting reaction product with ethylenically unsaturated fatty acids in a ratio of from about 0.8 to 1.2 acid equivalent of fatty acid per hydroxy equivalent of the rosin acid ester and (3) reacting the resultant polyester with at least 4% by weight, based on the polyester, of an ethylenically unsaturated polycarboxylic acid or an anhydride thereof.

These novel condensation products may also be described as compositions which are thinnable with water after neutralization and which contain free carboxyl groups, comprising the partially neutralized reaction product of:

(1) a polyepoxide and
(2) rosin acids, in a ratio of from about 0.5 to 1.0 acid equivalent of rosin acids per epoxy equivalent, said reaction product having been further esterified with
(3) an ethylenically unsaturated fatty acid in a ratio of from about 0.8 to 1.2 acid equivalent of fatty acid per hydroxy equivalent of the reaction product and with
(4) at least 4% by weight, based on the reaction product, of an ethylenically unsaturated polycarboxylic acid or an anhydride thereof.

The present invention also contemplates a process for coating a body capable of carrying an electric current with a uniform coating of the novel condensation products comprising:

(A) Immersing said body in an aqueous composition of a partially neutralized reaction product of:

(1) a polyepoxide and
(2) rosin acids, in a ratio of from about 0.5 to 1.0 acid equivalent of rosin acids per epoxy equivalent, said reaction product having been further esterified with
(3) an ethylenically unsaturated fatty acid in a ratio of from about 0.8 to 1.2 acid equivalent of fatty acid per hydroxy equivalent of the reaction product and with
(4) at least 4% by weight, based on the reaction product, of an ethylenically unsaturated polycarboxylic acid or an anhydride thereof.

(B) Passing an electric current through said aqueous composition and through said body to deposit a uniform water insoluble film thereon and (C) Curing said film.

POLYEPOXIDES

The polyepoxides to be used in preparing the present invention are described in substantial detail in U.S. Pat. No. 2,956,034 to Simpson. Briefly, they comprise the organic compounds possessing more than one vicinal epoxy group, i.e., more than one

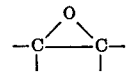

group, per molecule. These compounds may be saturated or unsaturated, aliphatic, cycloaliphatic, aromatic or heterocyclic and may be substituted with substituents such as chlorine, hydroxyl groups, ether radicals and the like. They may be monomeric or polymeric.

For clarity, many of the polyepoxides and particularly those of the polymeric type are described in terms of "epoxy equivalent" values. This expression refers to the average of the number of epoxy groups per molecule. The epoxy equivalent value is obtained by dividing the average molecular weight of the polyepoxide by the epoxide equivalent weight. The epoxide equivalent weight is determined by heating a sample of the polyepoxide with an excess of pyridinium chloride dissolved in pyridine at the boiling point and then back-titrating the excess pyridinium chloride with 0.1 N sodium hydroxide to the phenolphthalein end point. The epoxide value is calculated by considering one HCl as equivalent to one epoxide group. This method is used to obtain epoxide equivalent values referred to herein.

If the polyepoxide material is a single compound having all of the epoxy groups intact, the epoxy equivalent value will be in an integer. In the case of polymeric polyepoxides the material may contain some of the monomeric epoxide or have some of the epoxy groups hydrated or otherwise reacted and/or contain macromolecules of various molecular weights. In this case the epoxy equivalent may be a fractional value and may be only slightly higher than 1. Another suitable description of the epoxide content of an epoxy compound is in terms of epoxy equivalents per 100 grams.

Detailed discussion of polyepoxides suitable for use in this invention is found in the Simpson patent and in U.S. Pat. No. 2,633,458 to Shokal. So much of the disclosures of the Shokal patent as is relative to examples of polyepoxides is incorporated by reference into this specification.

Suitable monomeric polyepoxide compounds include diepoxidized alkadienes, diepoxidized alkenylcyclohexenes, diglycidyl ethers of dihydroxy aromatics and other polyglycidyl ethers of polyhydroxy aromatics, halo-substituted derivatives of such compounds, diepoxy ethers and the like.

Suitable polyepoxides further include the epoxidized esters of polyethylenically unsaturated monocarboxylic acids, such as epoxidized natural poly-unsaturated oils. Another group is the epoxidized esters of unsaturated monohydric alcohols and polycarboxylic acids. Another group is the epoxidized esters of unsaturated alcohols and unsaturated carboxylic acids. Another group is the epoxidized derivatives of polyethylenically unsaturated polycarboxylic acids. Another group is the epoxidized polyesters obtained by reaction of an unsaturated polyhydric alcohol and/or unsaturated polycarboxylic acid or anhydride. Another group is the glycidyl esters of polymerized unsaturated long-chain acids, such as dimer acids and trimer acids described hereinafter. Another group is the glycidyl esters of polybasic acids such as phthalic, o-phthalic acid.

Examples of the polymeric polyepoxides suitable for use in the invention include the polyepoxypolyhydroxy polyethers obtained by reacting a polyhydric alcohol or polyhydric phenol with a polyepoxide.

Other polymeric polyepoxide compounds include the polymers and copolymers of the epoxy containing monomers possessing at least one polymerizable ethylenic linkage. When this type of monomer is polymerized in the substantial absence of alkaline or acidic catalyst such as in the presence of heat, oxygen, peroxy compounds, actinic light and the like, it undergoes additional polymerization at the multiple bond leaving the epoxy group uneffected. These monomers may be polymerized with themselves or with other ethylenically unsaturated monomers.

The polyepoxides that are particularly preferred for use in the compositions of this invention are the polyglycidyl ethers and particularly the polyglycidyl polyethers of polyhydric phenols and those of polyhydric alcohols. The polyglycidyl ethers of polyhydric phenols can be obtained by reacting a polyhydric phenol with an excess, e.g., 4 to 10 mole excess, of a halogen-containing epoxide in an alkaline medium.

Epihalohydrin, particularly epichlorohydrin is usually preferred as the halogen-containing epoxide. The halogen-containing epoxides are further exemplified by epibromohydrin, 3-chloro-1,2-epoxybutane, 3-bromo-1,3-epoxyhexane, 3-chloro-1,2-epoxybutane, 3-bromo-1,3-epoxyhexane, 3-chloro-1,2-epoxyoctane and the like.

As polyglycidyl ether of a polyhydric phenol a polyglycidyl ether of 2,2-bis(4-hydroxyphenyl)propane is preferred. Polyglycidyl polyethers of this type may be represented by the general formula:

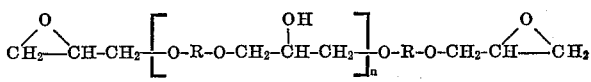

in which R represents the divalent group:

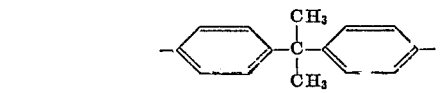

and $n$ has an average value of from 0 to, for instance, 12; during the preparation some of the terminal glycidyl groups may be hydrated to

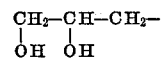

groups by reaction with water.

Preferred are polyglycidyl polyethers of 2,2-bis-(4-hydroxyphenyl)propane having a molecular weight of about 340–2000 and an epoxy equivalency of about 170–1200. Particularly preferred are polyglycidyl ethers of 2,2-bis-(4-hydroxyphenyl)propane having a molecular weight of about 700–1000 and an epoxy equivalent weight of about 400–600, in view of the favorable ratio between epoxy groups and free hydroxyl groups.

Rosin acids, also known as rosin or colophony, are largely tricyclic monocarboxylic acids, such as abietic acid and the related acids levopimaric acid, neoabietic acid, dextropimaric acid, dehydroabietic acid, dihydroabietic acid, tetrahydroabietic acid, iso-dextroprimaric acid. Rosin acids as used in this specification also include hydrogenated rosin acids which have an enlarged content of dihydro- and tetrahydro-abietic acid and hydrogenated related acids, and disproportionated rosin acids, which by a disproportionation process contain an enlarged content of dehydroabietic acid on one hand, and an enlarged content of dihydro- and tetrahydroabietic acid on the other hand. Hydrogenation or disproportionation of rosin acids may improve color stability of the rosin acids or of products obtained thereof.

The rosin acids are converted with the polyglycidyl ethers in ratios of from about 0.5 to 1 acid equivalent per epoxy equivalent. A ratio of about 0.7–1 acid equivalent of rosin acids per epoxy equivalent of polyepoxide is preferred. The reaction is carried out at elevated temperature, for example, at temperatuers between 150 and 250° C. Under these conditions the rosin acids react mainly with the epoxy groups of the polyepoxide by an addition reaction which may be represented by the general formula:

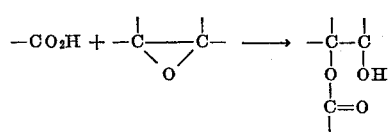

Reaction of the rosin acids with hydroxyl group of the polyepoxide or of the above primary reaction products may also take place, but is generally of minor importance owing to the greater reactivity of epoxy groups and to the ratios chosen.

The reaction may be considered as completed when there is no further decrease in the acid number. To avoid unexpectedly violent reactions the ester is preferably cooled before the ethylenically unsaturated fatty acid is added.

The ethylenically unsaturated fatty acids are added in amounts of from about 0.8 to 1.2 acid equivalent per hydroxy equivalent of the rosin acid ester. The number of hydroxy equivalents in the reaction mixture is found by deducting the number of acid equivalents of rosin acids from the number of potential hydroxy equivalents of the quantity of polyglycidyl polyether used. The number of potential hydroxy equivalents of the polyglycidyl polyether is calculated by dividing the actual weight of the esterification value; in this connection the potential hydroxy groups are the hydroxy groups present plus the epoxy groups, each epoxy group being counted as two hydroxy groups.

The ethylenically unsaturated fatty acids to be used are preferably those having more than one ethylenic group per molecule. Examples from this group of preferred fatty acids are fatty acids from drying oils such as linseed oil, tung oil, soyabean oil, fish oil, cotton seed oil, oiticica oil, perilla oil, sunflower seed oil; dehydrated castor oil fatty acids and tall oil fatty acids.

Both the conversion of the polyglycidyl polyethers with rosin acids and the esterification with fatty acids may be carried out in the presence of catalysts such as sodium carbonate, calcium oxide, zinc oxide, stannous oxide, calcium naphthenate, zinc naphthenate, stannous octoate, tertiary amines, quaternary ammonium salts, and triphenyl phosphine or mixtures thereof.

The esterification is carried out at elevated temperature, preferably at temperatures of 200–260° C. During esterification water is formed by reaction of carboxyl groups of the fatty acid with hydroxyl groups of the hydroxy ester. This water is removed by evaporation, for instance, by azeotropic distillation with a few percent by weight of xylene, for instance 3% by weight, based on the total weight of reactants, the water being separated from the xylene in a water trap after cooling. The esterification reaction is completed when further decrease in the acid number of the mixture becomes negligible; this is usually after 6–10 hours at reaction temperatures of about 240–260° C. When the heating periods are longer the viscosity often rises to an undesirable extent without any further decrease in the acid number.

The polyester is preferably cooled before the addition of the unsaturated carboxylic acid or carboxylic anhydride, for example, to about 100–200° C.

As ethylenically unsaturated polycarboxylic acid a dibasic acid, such as fumaric acid, may be used; preference is given to maleic acid, which is added in the form of the anhydride. The ethylenically unsaturated polycarboxylic acid or its anhydride reacts with the completely esterified polyether mainly by addition reactions with the hydrocarbon radical of the unsaturated fatty acid groups. The reaction temperature is preferably above about 175° C., for instance, 200–250° C. With higher reaction temperatures, such as 230–250° C., the viscosity may rise considerably when using large quantities of maleic anhydride, while long reaction times may result in gelling. The maintaining of low reaction temperatures, such as 200–210° C., is favorable for obtaining low-viscosity products. In general, the reaction time is from 20 minutes to more than 1 hour. It is advisable to control the course of reaction by measuring the viscosity. The quantity of unsaturated polycarboxylic acid or its anhydride is above 4% by weight, based on the weight of the polyester. Maleic anhydride is preferably used in quantities of from 4 to 10% by weight.

The range of reactions of the polyglycidyl polyether with rosin acid, with unsaturated fatty acid and with unsaturated polycarboxylic acid is preferably carried out in an inert, oxygen-free atmosphere, for instance, by passing nitrogen through or over the reaction mixture.

The reaction product, which contains free carboxyl groups, is cooled and can immediately be neutralized or be stored and transported as such. The neutralizing agent may be an alkali hydroxide such as potassium hydroxide; in general a nitrogen base is preferred, such as ammonia or a primary, secondary or tertiary aliphatic or cycloaliphatic amine, for instance, triethylamine, beta-dimethyl aminoethanol, monoethanolamine, diethanolamine, triethanolamine, monoisopropanolamine, di-isopropanolamine, cyclohexylamine, morpholine, piperidine and piperazine. The quantity of neutralization agent is selected in such a way that at least 40% of the carboxyl groups are neutralized. The pH of the neutralized binder depends on the degree of neutralization. If all the carboxyl groups are neutralized, the pH is higher than when only 70% or 50% of the carboxyl groups are neutralized. Complete neutralization usually gives products which dissolve in water completely without any haziness; in the case of partial neutralization the solutions in water are often somewhat hazy. The adjustment to a certain pH by means of partial neutralization may be desired in connection with proper dispersion of pigments.

A lyotropic solvent, such as an ethylene glycol monoalkyl ether, for instance, ethylene glycol monobutyl ether, is preferably added to promote the clear solubility in water. Such lyotropic solvents are preferably used in quantities up to 50% by weight, based on the weight of the carboxyl-containing condensation product. In view of the rather high viscosities of the condensation products it is advisable to add the solvent or a portion thereof, for example, about 10 parts by weight of lyotropic solvent per 100 parts by weight of condensation product, during the cooling of the reaction product, another amount after cooling and then to add the neutralization agent.

The completely or partially neutralized products may be stored, if desired, thinned with water, for a long time without substantial decrease in pH and without precipitation or phase separation taking place.

The solutions of the completely or partially neutralized products may be processed with many pigments to paints in the conventional way, for instance, by mixing in a ball mill, on a paint roller mill, etc. For application by spraying, brush, roller or dipping driers may be added in conventional quantities. As driers cobalt naphthenates and octoates are preferably used, for instance, in quantities up to 0.04% by weight of Co, based on the weight of the binder. Other naphthenates and octoates, such as those of zinc, calcium, manganese and lead may also be used. If desired, other curing components, such as urea formaldehyde resins and malamine formaldehyde resins, may also be added.

Paints and varnishes containing the present binders may be applied to articles in the usual way, for instance, by brush, roller or spraying. They are very suitable for electro-deposition on metals from a solution or dispersion, the metal to be coated serving as anode. The coat applied may be cured by any conventional means, preferably by accelerated drying at elevated temperature, such as about 100–200° C.

EXAMPLES

The following examples illustrate particular embodiments of the present invention, including the preferred embodiments. The invention is not to be interpreted as being limited by the illustrative examples, which are presented only to facilitate a better understanding thereof. Unless otherwise specified, "parts" is parts by weight. The rosin acids used were a commercial rosin having an acid equivalent weight of 350.

EXAMPLE 1

The following reactants were used:
A polyglycidyl ether of 2,2-bis(4-hydroxyphenyl)propane having:

|  | Parts |
|---|---|
| 0.214 epoxy equivalent/100 g. and 0.252 free hydroxy equivalent/100 g. (3.14 epoxy equivalent, 10 total hydroxy equivalent) | 1470 |
| Rosin (2.5 acid equivalent) | 875 |
| Linseed oil fatty acid (7.5 acid equivalent) | 2100 |
| Maleic anhydride | 338 |
| Triphenyl phosphine | 3.7 |
| Stannous octoate | 0.44 |

In a four-necked round-bottom flask with stirrer, thermometer, gas inlet tube, reflux condenser with water trap, and heating jacket the above quantities of polyglycidyl ether, rosin, and triphenyl phosphine were heated at 200° C. for one hour, in a nitrogen atmosphere; the acid number was then 0.8, indicating that essentially all rosin had been esterified. The linseed oil fatty acid and stannous octoate were added, and the mixture was kept at 240° C. during 9 hours, the water formed being removed by azeotropic distillation with xylene. The acid number of the polyester was 12.6, and 108 parts by volume of water were collected in the water trap.

After cooling to 200° C. the maleic anhydride (7.8% by weight of the polyester) was added, and the mixture was heated at 205° C. during one hour: the acid number was 60 and the viscosity 1130 poises at 50° C.

The condensation product was cooled to 100° C., diluted with 30 parts by weight of ethylene glycol monobutyl ether per 80 parts by weight of condensation product, and cooled to ambient temperature. Samples were neutralized with 0.6, 0.5 and 0.4 equivalent triethylamine (TEA) per acid equivalent and diluted with demineralized water to provide 10% by weight solutions. The pH-stability of these solutions was as follows:

| Temp., °C. | Eq. neutr. TEA | pH |  |  |  |  |
|---|---|---|---|---|---|---|
|  |  | Initial | 1 week | 2 weeks | 1 month | 2 months |
| 23 | 0.6 | 9.1 | 8.9 | 8.8 | 8.8 | 8.8 |
| 23 | 0.5 | 8.5 | 8.4 | 8.4 | 8.4 | 8.5 |
| 23 | 0.4 | 8.3 | 8.3 | 8.0 | 8.1 | 8.2 |
| 40 | 0.6 | 9.1 | 8.9 | 8.6 | 8.5 | 8.3 |
| 40 | 0.5 | 8.5 | 8.4 | 8.3 | 8.2 | 8.0 |
| 40 | 0.4 | 8.3 | 8.2 | 7.9 | 7.9 | 7.2 |

EXAMPLE 2

Water-thinnable paint, preparation, evaluation, and comparison with another primer.

The 80/30 solution of condensation product of Example 1 in ethylene glycol monobutyl ether was neutralized with 0.5 equivalent of TEA per acid equivalent and diluted with demineralized water to 25% by weight of resin. 295 parts of this soution were compounded in a ball mill for 24 hours with 254 parts of pigment mixture (containing 60% by weight of red iron oxide, 35% by weight of titanium dioxide, and 5% by weight of clay) and 8 parts of butyl alcohol (anti-foaming agent). The ball mill charge (546.6 parts) was mixed with 25% by weight aqueous resin solution (2197 parts) and water (3056.5 parts) to obtain a primer with 15% by weight solids, a pigment/binder weight ratio of 0.4, a pH of 8.6, and a specific resistance of 1000Ω cm. at 23° C.

This primer was electro-deposited on bonderized steel panels having a surface of 330 cm.² in bath during two minutes at a constant voltage of 220 v. (initial amperage: 2.2 a., final amperage: 0.08 a.); the coated panels where stoved at 175° C. during 30 minutes, and examined.

The results are summarized under A in the table below:

|  | A | B |
|---|---|---|
| Film thickness ($\mu$) | 28 | 30 |
| Film appearance | 9 | 8 |
| Hardness (Bucholz) | 100 | 110 |
| Hardness (Sward) | 26 | ------ |
| Mandrel bend test | (1) | (1) |
| Erichsen reverse impact | (2) | (2) |
| 240 h salt-spray exposure (ASTM B 117-64) | 8 | 5 |
| Humidity test (DEF 1053), 2 weeks | 10 | 10 |
| Resistance to NaOH (5% wt.), 25° C.: |  |  |
| After 1 day | 10 | 10 |
| After 4 days | 6F | 6F |

¹ Pass 1/16″.
² Pass 7 mm.

The figures for film appearance, salt-spray exposure and humdity test and alkali resistance 1 day are ratings in the sale 10=film not affected and 0=film destroyed. For the salt-spray resistance the rating 8 means underrust 1-2 mm. creep from scratch and few isolated small blisters, and the rating 5: underrust 1 cm. creep from scratch and many groups of blisters. Rating 6 F for alkali resistance after 4 days means a few small blisters (ASTM D 714-65).

The results under B in the table above are for a water-thinnable paint which contained as the binder the resin described in copending U.S. application S.N. 786,467, now abandoned Example I, and prepared from the polyglycidyl ether used in present Example I, benzoic acid, linseed oil fatty acids and maleic anhydride, neutralized with 0.6 equivalent triethylamine per acid equivalent, formulated, compounded, deposited and stoved exactly as described above for the condensation product of Example 1 of the present application, i.e., without chromate pigment.

Comparison of the values for A and B shows that the mechanical properties are about the same; however, there is considerable difference in salt-spray resistance: a rating 8 (often required for paints in the automotive industry) can be attained with the binder (A) according to the invention without the use of chromate pigments, but not with the binder (B) in the absence of chromate pigment. In this connection it should be borne in mind that in the presence of chromate pigment a salt-spray resistance rating of 8 can be attained with the binder (B) as well. This demonstrates that the binder according to the invention can find a more general use, in particular for electro-deposition.

I claim as my invention:

1. A process for the preparation of condensation products which are thinnable with water after neutralization and which contain free carboxyl groups comprising (1) reacting a polyglycidyl ether of 2,2-bis(4-hydroxyphenyl)propane with rosin acids in a ratio of from about 0.5 to 1.0 acid equivalent of rosin acids per epoxy equivalent, (2) esterifying the resulting product with ethylenically unsaturated fatty acids containing more than one ethylenic group per molecule in a ratio of from about 0.8 to 1.2 acid equivalent of fatty acid per hydroxy equivalent of the resin acid ester and (3) reacting the resultant polyester with 4%–10% by weight, based on the polyester, of maleic anyhdride.

2. A process for the preparation of water thinnable condensation products comprising (1) reacting a polyglycidyl ether of 2,2-bis (4-hydroxyphenyl) propane with rosin acids in a ratio of from about 0.5 to 1.0 acid equivalent of rosin acids per epoxy equivalent, (2) esterifying the resulting product with ethylenically unsaturated fatty acids containing more than one ethylenic group per molecule in a ratio of from about 0.8 to 1.2 acid equivalent of fatty acid per hydroxy equivalent of the rosin acid e ster, (3) reacting the resultant polyester with 4%–10% by weight, based on the polyester, of maleic anhydride and (4) neutralizing at least 40% of the carboxyl groups in the condensation product formed in step 3.

3. A composition thinnable with water which contains free carboxyl groups, comprising the partially neutralized reaction product of
 (1) a polyglycidyl ether of 2,2-bis(4-hydroxyphenyl)-propane and
 (2) rosin acids, in a ratio of from about 0.5 to 1.0 acid equivalent of rosin acids per epoxy equivalent, said reaction product having been further esterified with
 (3) an ethylenically unsaturated fatty acid containing more than one ethylenic group per molecule in a ratio of from about 0.8 to 1.2 acid equivalent of fatty acid per hydroxy equivalent of the reaction product and with
 (4) 4%–10% by weight, based on the reaction product, of maleic anhydride.

4. A composition as in claim 3, wherein at least 40% of the carboxyl groups in the reaction product are neutralized.

References Cited

UNITED STATES PATENTS

| | | | |
|---|---|---|---|
| 3,355,401 | 11/1967 | Tanner | 260—18 |
| 3,479,306 | 11/1969 | Safranski | 260—18 |
| 3,563,929 | 2/1971 | Guldenpfenning | 260—23 |
| 3,567,668 | 3/1971 | Guldenpfenning | 260—19 |

FOREIGN PATENTS

| | | | |
|---|---|---|---|
| 588,799 | 12/1959 | Canada | 260—18 |
| 659,589 | 3/1963 | Canada | 260—22 |
| 962,974 | 7/1964 | Great Britain | 260—22 |
| 6,404,060 | 10/1964 | Netherlands | 260—22 |

M. J. WELSH, Primary Examiner

R. W. GRIFFIN, Assistant Examiner

U.S. Cl. X.R.

117—132 BE, 161 K, 161 ZB; 204—181; 260—29.2 E, 29.2 EP, 32.4; 32.6 R